Dec. 10, 1963

R. J. MULLIGAN 3,114,089

CONTROLLER WHOSE OUTPUT IS PROPORTIONAL
TO A METER POINTER POSITION

Filed Oct. 18, 1961

INVENTOR
Robert J. Mulligan
BY Peck & Peck
ATTORNEYS

Dec. 10, 1963 R. J. MULLIGAN 3,114,089
CONTROLLER WHOSE OUTPUT IS PROPORTIONAL
TO A METER POINTER POSITION
Filed Oct. 18, 1961 3 Sheets-Sheet 2

INVENTOR
Robert J. Mulligan
BY Peck & Peck
ATTORNEYS

Dec. 10, 1963   R. J. MULLIGAN   3,114,089
CONTROLLER WHOSE OUTPUT IS PROPORTIONAL
TO A METER POINTER POSITION
Filed Oct. 18, 1961   3 Sheets-Sheet 3

INVENTOR
Robert J. Mulligan
BY Peck & Peck
ATTORNEYS

United States Patent Office 3,114,089
Patented Dec. 10, 1963

3,114,089
CONTROLLER WHOSE OUTPUT IS PROPORTIONAL TO A METER POINTER POSITION
Robert J. Mulligan, Hamden, Conn., assignor to International Instruments, Incorporated, Orange, Conn., a corporation of Connecticut
Filed Oct. 18, 1961, Ser. No. 145,888
6 Claims. (Cl. 318—31)

This invention relates broadly to the operation of a final control element in direct proportion to the pointer travel of an indicating meter movement, whether mechanically or electrically actuated; and in its more specific aspects it relates to a mechanism associated with an electrical indicating meter, preferably a D'Arsonval movement, whereby a final control member or mechanism is caused to operate in direct proportion to the travel of the pointer of an indicating meter; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

An indicating meter, such as a D'Arsonval movement, is a reliable and accepted mechanism for measuring currents and voltages, and its utility would be substantially enhanced if it were possible to translate the movement of the indicating pointer by small microwatt signals to relatively high output rotary power connected to a final control element or mechanism so that the position or movement of such final control element would be in direct proportion to the pointer position or the pointer travel.

Such a device as that broadly outlined above would be advantageous in, for instance, the recorder and digital voltmeter fields. It could be used for valve actuation, and to provide voltage amplification, and it would be useful in position movement for antennas and the like, such movement being relative to the meter pointer position or movement.

I have devised a meter which involves mechanism of a relatively simple nature whereby the travel of the meter pointer is translated to relatively high output rotary power so that the position of a final control element or mechanism is in direct proportion to the pointer position. This mechanism which I have developed finds is usefulness not only in the fields mentioned above, but also in many others which will be understood by those skilled in the art following a full and complete disclosure of my invention.

This invention is particularly applicable for use with a memory type control meter which provides on and off control at a set point which is manually positioned. Such memory type control meters usually involve a manually positioned set point arm which carries a pair of coils, one being an oscillator coil and the other a pick-up coil, and the meter pointer carries a vane or shield which passes between and shields the coils as the pointer travels in its indicating course. When the coils are shielded by the meter vane, a semi-conductor output switches from one state to the other to cause a control action.

In developing my invention I made use of the above principles and I used a single set point arm carrying two spaced-apart pairs of coils, each pair comprising an oscillator coil and a pickup coil, and I so formed the vane on the indicating pointer that the vane will be between one or the other pairs of coils when the pointer is not in line with the set point arm and an actuation of the mechanism will occur to move the set point arm into alignment with the pointer at which time actuation of the mechanism will cease because the vane on the pointer is positioned out of shielding position with respect to both pairs of coils.

In using the above-discussed concept to achieve my purposes I provide a servo type motor, the direction of operation of which is controlled by the output of the respective pair of coils on the set point arm, which moves the set point arm into alignment with the pointer and causes the operation of some final control element, which operation is in direct proportion to the movement of the pointer since the set point arm moves the same amount in reaching a position in alignment with the pointer.

I have devised an electrical system for use with the meter of this invention which provides high resolution and is relatively simple.

It is also within my contemplation where high resolution is desired to so design my device that when the pointer and set point arm are in alignment, both pairs of coils are partially shielded, so that a slight movement of the pointer in either direction will be sensed with full output to the motor occurring.

The means which I have devised for controlling an element in direct proportion to the pointer travel of an indicating meter does not adversely affect the operation and accuracy of the meter, is relatively simple, and has wide application in many control fields.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
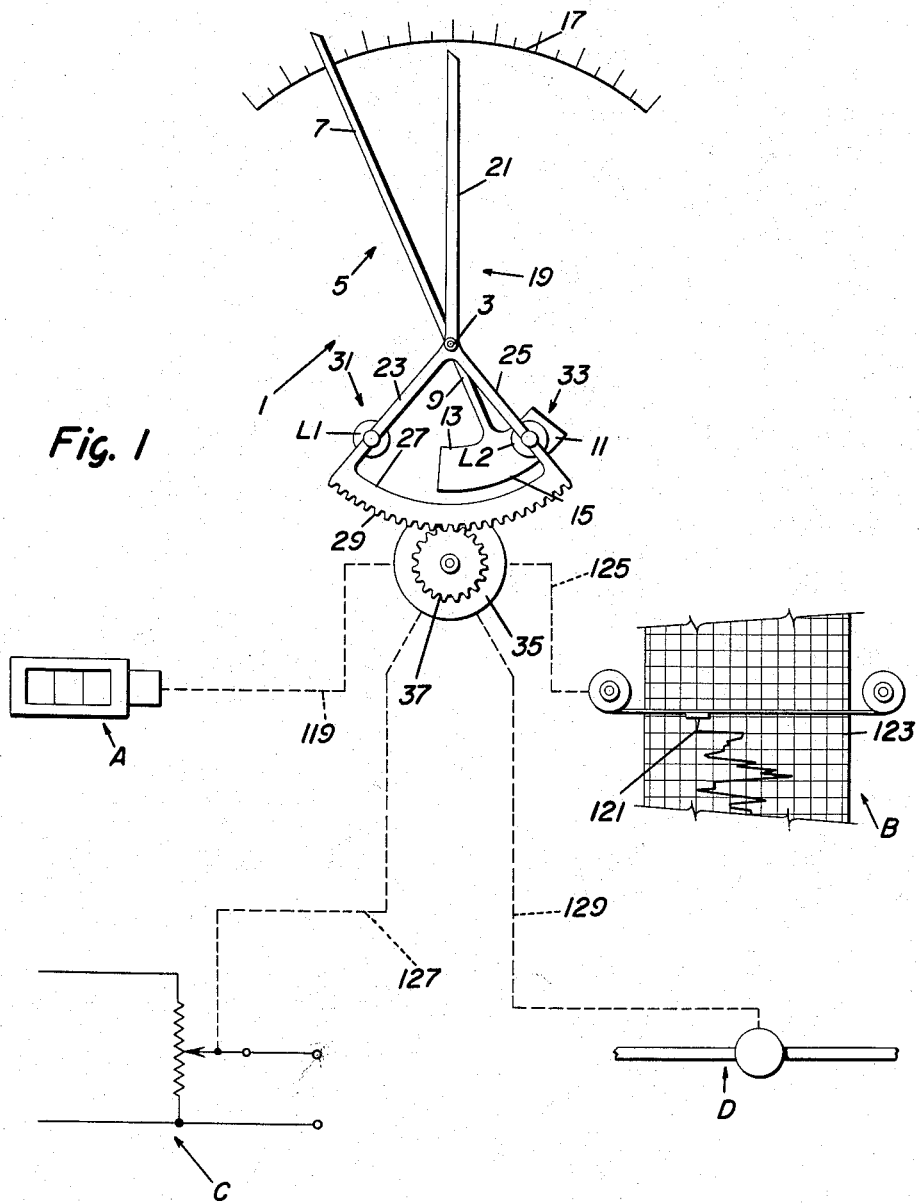
FIG. 1 is a diagrammatic view of a memory type control meter involving the mechanism of this invention and disclosing, as some examples, from among many of the devices which may be controlled by my invention.

In the accompanying drawings I have used the numeral 1 to designate generally an indicating meter which is shown diagrammatically and includes those components thereof which are necessary in the practice of my invention. The numeral 3 designates the meter movement center on which the meter pointer, which is designated in its entirety by the numeral 5, operates in a conventional manner. The meter pointer includes a section 7 which extends forwardly of center 3, and a section 9 which extends rearwardly of center 3. A shielding vane 11 is fixed to or formed integrally with the rear section 9 of the pointer and is of elongated shape generally normal to the longitudinal axis of the meter pointer and its inner longitudinal edge 13 is inwardly curved or concave while its outer longitudinal edge 15 is outwardly curved or convex. The meter 1 is provided with the usual scale 17 over which the end of the forward section 7 of the meter pointer traverses in its indicating movements.

Mounted in any suitable manner for pivotal movement on center 3 is a set point arm indicated in its entirety by reference numeral 19. The set point arm includes a section 21 extending forwardly of center 3 and extending forwardly toward the scale and in a plane removed from that in which pointer 5 travels so that the pointer may travel freely up and down scale. I provide the set point arm 19 with a pair of rearwardly diverging arms 23 and 25 which are connected at their rear ends by a curved gear segment 27, the teeth 29 of which are formed on the rear convex edge thereof. Adjacent to but forwardly spaced from each end of each diverging arm I mount a pair of coils designated generally by numerals 31 and 33, each pair of coils comprising oscillator coils L1 and L2 and pick-up coils L3 and L4 (see FIG. 4). It is to be understood that each pick-up coil is in spaced relation to its respective oscillator coil and the pick-up coils may be supported from arms 23 and 25 in proper spaced position by any suitable bracket or the like arrangement.

Figure 2:
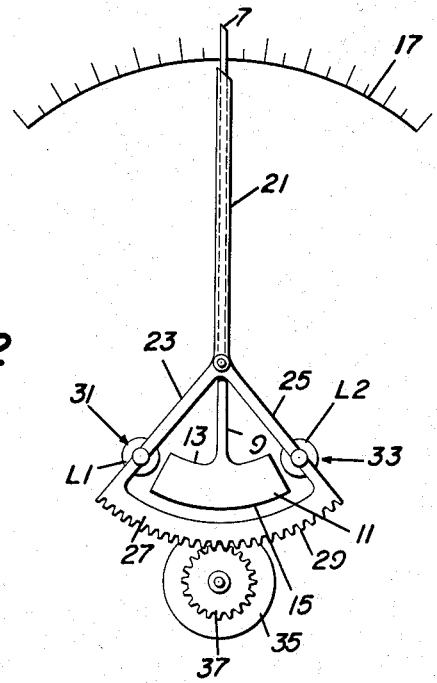
FIG. 2 is a view similar to FIG. 1 but showing the position of the various components when the meter pointer and the set point arm are in alignment.

Consideration of FIGS. 1 and 2 indicates that the overall length of the vane 11 is less than the distance separating pairs of coils 31 and 33 from each other so that the vane will not extend between the coils of either pair when the pointer is in position aligned with the set point arm. It is also to be noted that the diverging set point arms 23 and 25 diverge from section 21 of the set point arm at the same angle.

I provide a servo type D.C. motor 35 which carries a gear 37 on its shaft. The motor 35 and gear 37 are so mounted and positioned that the gear is in mesh with the teeth 29 of gear segment or rack 27.

With the components mounted and arranged as shown in FIG. 1, as an example, and with the set point arm set at some arbitrary value such as 50% of full scale value and the pointer 5 reading at 20% full scale value, it will be seen that the vane will extend between the coils 33 shielding the oscillator coil L2 from the pick-up coil L4. When such relative positioning of the components of my invention occurs, the motor will be driven through the electrical means included in the circuit of FIG. 4 in a direction to move the set point arm down scale until it is in alignment with the pointer.

Figure 4:
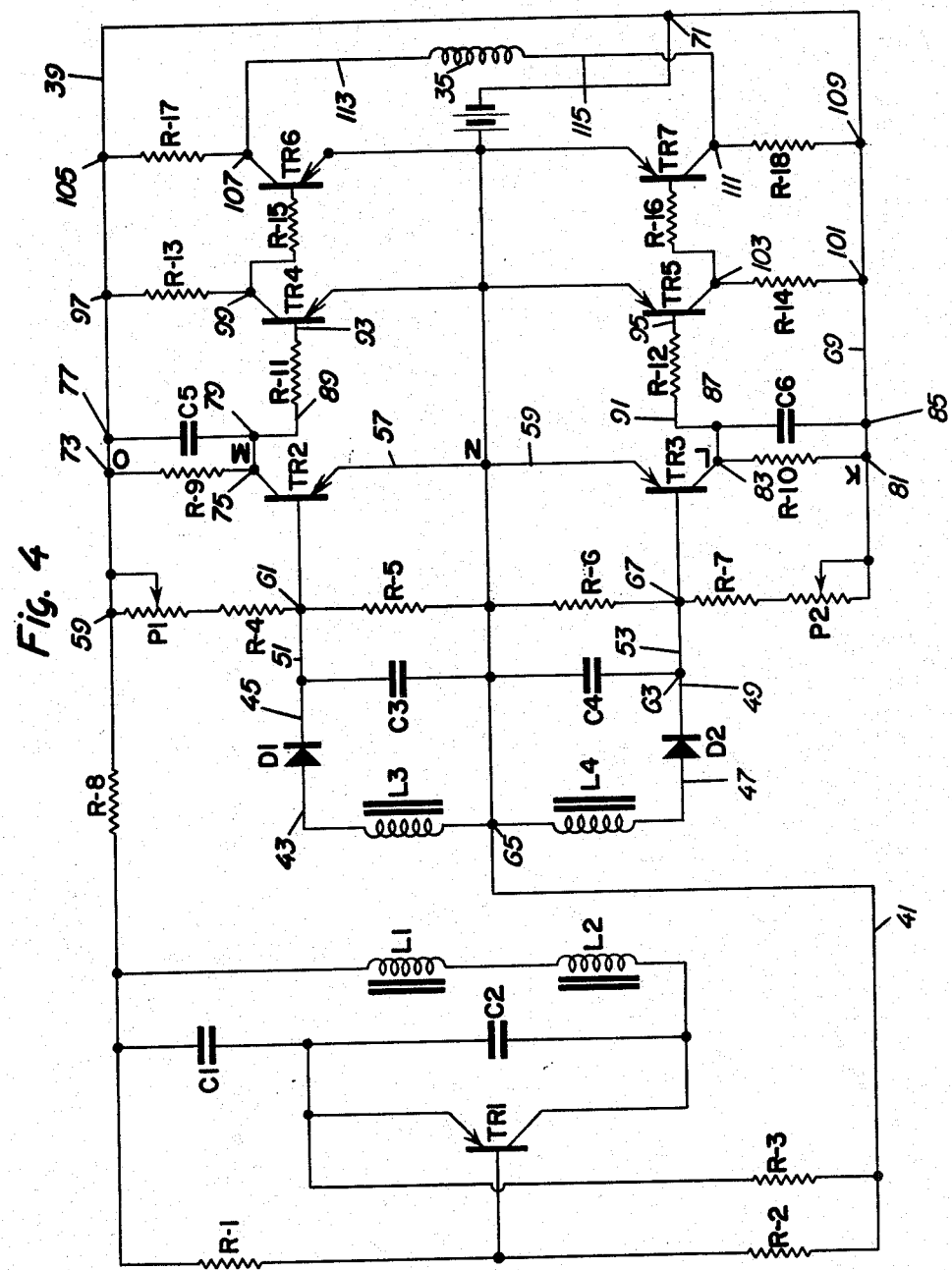
FIG. 4 is a diagram of an electric circuit for use with this meter.

Referring to the diagram of FIG. 4, it will be seen that I use a Colpitts transistor circuit which comprises resistors R1, R2, R3, transistor TR1, condensers C1 and C2 and oscillator coils L1 and L2 which supply energy to pick-up coils L3 and L4. Power is supplied to the oscillator circuit from input lines 39 and 41, which also power the circuit including pick-up coils L3 and L4.

The control circuit is connected to the input leads 39 and 41 and includes the pick-up coils L3 and L4, the coil L3 being connected to rectifier D1 by conductor 43, and the rectifier D1 being connected to capacitor C3 by conductor 45. The pick-up coil L4 is connected to rectifier D2 by conductor 47 and capacitor C4 and rectifier D2 are connected by conductor 49. Lead 51 connects a transistor TR2 between rectifier D1 and capacitor C3 while a lead 53 connects a transistor TR3 between rectifier D2 and capacitor C4. The transistors TR2 and TR3 are connected to lead 41 by conductors 57 and 59, respectively. A resistive network is provided comprising resistors R4 and R5 which are connected to power lead 39 at 59 and to conductor 51 at 61 and to lead 41 through terminal 65, and a further resistive network is provided comprising resistors R6 and R7 which are in series with resistors R4 and R5 and are connected at 67 to conductor 53 and through conductor 69 to input lead 39 at 71, R6 being connected to lead 41 at 65. Potentiometers P1 and P2 may be included in the resistive network. A load resistor R9 is connected at 73 to lead 39 and at 75, to TR2. I provide a capacitor C5 connected at 77 to one end of resistor R9, and to TR2 at 79. A similar load resistor R10 is included in coil L4 circuit, this load resistor being connected at 81 to conductor 69 and at 83 to TR3. I provide a further capacitor C6 in the L4 coil circuit which is connected at 85 to one end of load resistor R10 and to TR3 at 87. The above comprises a switching mechanism which is one of a semi-conductor. It has been found preferable to add two amplifier stages to this semi-conductor circuit and connect the D.C. servo motor across the output, in order to provide the necessary sensitivity. The two amplifier stages include resistors R11 and R12, one being connected into the L3 coil circuit and the other being connected into the L4 coil circuit. The resistor R11 is connected into the L3 coil circuit at 79 by means of conductor 89, while resistor R12 is connected into L4 coil circuit at 87 by means of conductor 91. Each circuit includes transistors TR4 and TR5 which are connected to resistors R11 and R12 by conductors 93 and 95, respectively. Resistors R13 and R14 are provided in the coil circuits, the resistor R13 being connected at 97 to input lead 39 and at its other end to TR4 at 99, while resistor R14 is connected to lead 39 at 101 and to TR5 at 103. Further transistors TR6 and TR7 are connected into their respective coil circuit, the transistor TR6 being connected at 99 through resistor R15 and transistor TR7 being connected at 103 through resistor R16. A resistor R17 is connected at 105 to lead 39 and at 107 to TR6; a further resistor R18 is connected to lead 39 at 109 and to transistor TR7 at 111. The servo motor 35 is connected across the output of the circuits by means of conductors 113 and 115.

In the example shown in FIG. 1 of the drawings the shield 11 on the pointer 5 is shielding coils L2 and L4 so that the magnetic coupling is disturbed in such a manner as to reduce the voltage induced in coil L4 by coil L2 which is magnetically coupled to it. When this occurs, transistor TR3 will be in low resistance, high conducting state, and transistor TR2 will be in a low conducting, high resistance state. With this condition of the transistors current through the load travels from point O through R9 to point M through the amplifier stages and the load to point L and through transistor TR3 to point N. In travelling this path M is negative and point L is positive with respect to the load and the D.C. servo motor 35 will operate in a direction to function through its gear 37 and rack 29 to move set arm 19 down scale to null point in alignment with pointer 5. When the pointer is in alignment with the set point arm, as illustrated in FIG. 2, and is not shielding either set of coils, the transistors TR2 and TR3 are both in non-conducting state and the outputs being equal, the potential at points M and L are equal so that no current flows through the output and the motor will not be operated in either direction.

Now, let it be assumed that the pointer has travelled upscale beyond the set point arm so that vane 11 will extend between pair of coils 31 to shield pick-up coil L3 from oscillator coil L1. In this condition, transistor TR3 will continue in a high resistance or low conducting state and therefore current through the load will flow from the negative point K through R10 to point L, but not through transistor TR3 from point L through the load resistance to point M and through transistor TR2 to positive point N. Thus, the polarity across the load is reversed in that point M is positive and point L is negative with respect to the load and the servo motor will be operated in the reverse direction to that just described.

Thus, I have provided a system of high resolution using the described semi-conductor switching mechanism and sensitivity due to the addition thereto of the two amplifier stages, the D.C. motor being connected across the outputs thereof. We have seen from the above description that when one pick-up coil is shielded, the current will flow through the motor in one direction and when the other pick-up coil is shielded, it will flow through the motor in the opposite direction, and there will be no current flow when both pick-up coils are not shielded, partially shielded or totally shielded. Thus, it will be appreciated that for any position the pointer may assume, the set point arm will be caused to assume the same position.

I have used the two amplifier stages primarily to build up the bias current without overloading any one transistor. For instance, the last stage is of the heavy current variety of 1 to 3 amperes, the intermediate stage acting as a buffer between the switching mechanism in the primary control circuit and the last power stage.

As I have stated above, I have devised a mechanism whereby the movement of the meter indicating pointer may be translated to relatively high output rotary power and in FIG. 1 I have illustrated schematically several, from among many, examples of how this power may be used to control the position of a final mechanism so that it is in direct proportion to the pointer position.

Referring to FIG. 1 I have illustrated schematically a digital readout counter A which may be connected to gear 37 by any suitable means 119. This counter may be so designed that for zero position of the pointer, which causes a zero position of the set point arm, the digital readout may read zero. For full scale it will read 100%, and for any position which the set point arm may assume it will read a proportional amount in digits.

Thus, my invention may provide a low cost digital voltmeter, microampere meter and the like which does not require a reference source since it uses the meter calibration as its reference. Furthermore, it does not require amplifying the input signal which eliminates the chopper and amplifier used in conventional systems. It is also not a disadvantage that its input impedance would be that of a conventional meter.

As another use to which my invention may be put, I have schematically shown a recorder B which may be of any conventional low cost type. The recorder includes the usual pen 121, paper 123, and any usual means for causing travel of the pen over the paper in response to rotation of gear 37 which is connected through any suitable means 125 to the pen operating mechanism. Thus, I may provide a recorder with a linear scale, if desired, and with the pen responding to deflection of the meter pointer.

At C I have shown schematically a potentiometer which is connected to gear 37 by means 127. As the gear rotates, it turns the shaft of the potentiometer. For instance, I may have 100 volts across the potentiometer and can provide an amplifier with proportional output to the meter pointer position. Thus, as the gear turns, at the one input terminal will appear a voltage in proportion to the meter pointer position, which will also be in proportion to the signal to the meter which may be, for example, 0–100 microamperes.

It is also contemplated to attach the meter drive to a flow valve D by any suitable means 129. In this application the flow valve would be caused to open and close in proportion to the input signal to the meter movement.

The above uses to which my invention may be put are but a few of the many which are within my contemplation and are herein disclosed merely by way of example and not as a limitation on the scope of my invention.

Figure 3:
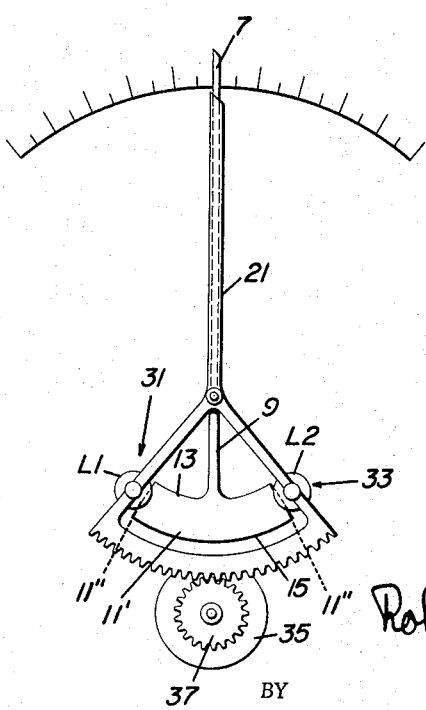
FIG. 3 is a diagrammatic view of another form of my device wherein each pair of coils is partially shielded when the meter pointer and the set point arm are in alignment.

In FIG. 3 of the drawings I have illustrated a modified form of my invention and have used the same reference numerals as used with reference to FIG. 1, to designate similar parts.

In this form of my invention I provide a vane 11' which is attached to pointer 5 in the same manner as hereinabove described; however, the vane 11' is of greater overall length than the vane 11 and when the pointer is in alignment with the set point arm, the vane 11' will partially shield each pair of coils, as shown in dotted lines at 11''. Thus, vane 11' has a greater overall length than the distance between opposing peripheries of coils 31 and 33.

I have found that for greatest resolution the form of my invention illustrated in FIG. 3 is highly satisfactory, for with both coils partially shielded a slight movement of the pointer in either direction will be sensed with full output to the meter.

I claim:

1. A controller whose output is proportional to a meter pointer position including, in combination, a meter including a scale and an indicating pointer adapted to traverse said scale in its indicating movements, a pivotally mounted manually positionable set point arm adapted to be manually positioned at any value on said scale and movable into position in alignment with said pointer in any indicating position it has assumed, and mechanism for causing said set point arm to move into position in alignment with said pointer, said mechanism including a pair of spaced apart inductive couplings on said set point arm which are movable therewith, shielding means movable with said pointer as it traverses the meter scale in its indicating movements, one inductive coupling being in the path of movement of said shielding means as it moves in one direction and the other inductive coupling being in the path of movement of said shielding means as it moves in the other direction, said shielding means being dimensionally such and so related to said spaced apart inductive couplings that when said pointer and set point arm are in alignment, the shielding means will be removed from each of said inductive couplings, and when said pointer and set point arm are out of alignment, said shielding means will extend into one or the other of said inductive couplings, an electric circuit, said spaced apart inductive couplings being connected to said electric circuit, a drive means connected to said electric circuit, said electric circuit including means causing the output thereof to be of one polarity when said shielding means is in one inductive coupling and to be of the opposite polarity when the shielding means is in the other inductive coupling to cause reversible operation of said drive means and to cause no current to flow in the output when the shielding means is removed from each inductive coupling and the pointer and set point arm are in alignment, and further means connecting said drive means to said set point arm for moving the set point arm in a direction to cause it to be aligned with said pointer.

2. A controller in accordance with claim 1 wherein said shielding means is elongated and the overall length thereof is less than the distance between said spaced apart inductive couplings.

3. A controller whose output is proportional to a meter pointer position including, in combination, a meter including a scale and an indicating pointer adapted to traverse said scale in its indicating movements, a pivotally mounted manually positionable set point assembly, said set point assembly including a portion extending forwardly from its pivotal axis and a pair of arms diverging rearwardly from said pivotal axis, a pair of coils mounted on each arm and each pair of coils comprising an oscillator coil and a pick-up coil, elongated shielding means carried on the rear end of said pointer and movable into and out of positions between the coils of said pairs of coils to shield a pick-up coil from an oscillator coil, said shielding means being of less length than the distance between said pairs of coils so that when said pointer and said portion of the set point assembly are aligned, said shielding means will be removed from position between the coils of either pair of coils and when said pointer and said portion of the set point assembly are out of alignment, said shielding means will extend between the coils of one or the other of said pairs of coils, an electric circuit, said pairs of coils being connected to said electric circuit, a drive means connected to said electric circuit, said electric circuit including means causing the output thereof to be of one polarity when said shielding means is between the coils of one pair of coils and to be of the opposite polarity when the shielding means is between the coils of the other pair of coils to cause reversible operation of said drive means and to cause no current to flow in the output when the shielding means is removed from each pair of coils and the pointer and said portion of the set point assembly are in alignment, and further means connecting said drive means to said set point assembly for moving the set point assembly from its manually adjusted position in a direction to cause said portion thereof to be aligned with said pointer.

4. A controller in accordance with claim 3, wherein said further means comprises a rack fixed to and extending between said pair of arms rearwardly of said pair of coils, and a gear operated by said drive means and in mesh therewith.

5. A controller whose output is proportional to a meter pointer position including, in combination, a meter having a scale and including an indicating pointer adapted to traverse the scale in its indicating movements, a pivotally mounted set point assembly having a forward leg extending toward said scale and a pair of arms diverging rearwardly from the rear end of said leg, the arms extending at the same angle from said leg, said set point arm assembly being movable to move said leg into alignment with said pointer in any indicating position it has assumed, a pair of coils mounted on each arm of said set point assembly and each pair of coils comprising an oscillator coil and a pick-up coil, elongated shielding means carried on the rear end of the pointer and movable into and out of positions between the coils of said pairs of coils to shield a pick-up coil from an oscillator coil, said shielding means being of less length than the distance between said pairs of coils so that said shielding means will be removed from position between the coils of either pair of coils when said pointer and the leg of the set point assembly are in alignment, said when said leg of the set point assembly and the pointer are out of alignment, said shielding means will extend between the coils of one or the other of said pairs of coils, an electric circuit, said pairs of coils being connected to said electric circuit, a drive means connected to said electric circuit, said electric circuit including means causing the output thereof to be of one polarity when said shielding means is between the coils of one pair of coils and to be of the opposite polarity when the shielding means is between the coils of the other pair of coils to cause reversible operation of said drive means and to cause no current to flow in the output when the shielding means is removed from each pair of coils and the pointer and leg of the set point assembly are in alignment, and further means connecting said drive means to said set point assembly for moving the set point assembly in a direction to cause the leg thereof to be aligned with the pointer.

6. A controller whose output is proportional to a meter pointer position including, in combination, a meter including an indicating pointer adapted to traverse a meter scale in its indicating movements, a pivotally mounted set point arm movable into position in alignment with said pointer in any indicating position it has assumed, and mechanism for causing said set point arm to move into position in alignment with said pointer, said mechanism including spaced apart means on said set point arm and movable therewith for creating inductive couplings, shielding means movable with said pointer as it traverses the meter scale in its indicating movements, the inductive couplings being in the path of movement of said shielding means, said shielding means being dimensionally such and so related to said spaced apart means that when said pointer and set point arm are in alignment, said shielding means will extend the same distance partially into each of said inductive couplings, and when said pointer and set point arm are out of alignment, said shielding means will fully extend into one or the other of said inductive couplings while being completely removed from the other, an electric circuit, said spaced apart means being connected to said electric circuit, a drive means connected to said electric circuit, said electric circuit including means causing the output thereof to be of one polarity when said shielding means is fully in one inductive coupling and to be of the opposite polarity when the shielding means is fully within the other inductive coupling to cause reversible operation of said drive means and to cause no current to flow in the output when the shielding means is partially in each inductive coupling and the pointer and set point arm are in alignment, and further means connecting said drive means to said set point arm for moving the set point arm in a direction to cause it to be aligned with said pointer.

References Cited in the file of this patent

UNITED STATES PATENTS

| | | |
|---|---|---|
| 713,258 | Weston et al. | Nov. 11, 1902 |
| 1,988,458 | Minorsky | Jan. 22, 1935 |
| 2,077,086 | Adair | Apr. 13, 1937 |
| 2,462,566 | Smith | Feb. 22, 1949 |